United States Patent
Lin et al.

(10) Patent No.: US 9,253,072 B2
(45) Date of Patent: Feb. 2, 2016

(54) POLARITY DETECTION SYSTEM

(71) Applicant: BROADCOM CORPORATION, Irvine, CA (US)

(72) Inventors: Xiaotong Lin, Saratoga, CA (US); Mehmet Vakif Tazebay, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 118 days.

(21) Appl. No.: 14/060,980

(22) Filed: Oct. 23, 2013

(65) Prior Publication Data
US 2014/0112176 A1    Apr. 24, 2014

Related U.S. Application Data

(60) Provisional application No. 61/718,140, filed on Oct. 24, 2012.

(51) Int. Cl.
*H04L 12/26* (2006.01)
*H04L 5/14* (2006.01)
*H04L 5/16* (2006.01)

(52) U.S. Cl.
CPC .............. *H04L 43/50* (2013.01); *H04L 5/1438* (2013.01); *H04L 5/16* (2013.01)

(58) Field of Classification Search
CPC ........... H04L 5/16; H04L 5/1438; H04L 1/00; H04L 7/06; H04B 7/2606
See application file for complete search history.

(56) References Cited

U.S. PATENT DOCUMENTS 4,807,261 A * 2/1989 Johnson ......................... 375/365
5,257,287 A * 10/1993 Blumenthal et al. .......... 375/292

(Continued)

FOREIGN PATENT DOCUMENTS

CN    201821098 U    5/2011
CN    102656574 A    9/2012

(Continued)

OTHER PUBLICATIONS

"Scrambler" from Wikipedia, the free encyclopedia, Aug. 21, 2013, retrieved from <http://en.wikipedia.org/w/index.php?title=Scrambler&oldid=569505100>.

(Continued)

*Primary Examiner* — Derrick Ferris
*Assistant Examiner* — Jay Vogel
(74) *Attorney, Agent, or Firm* — McDermott Will & Emery LLP

(57) ABSTRACT

In the subject system for polarity detection, link initialization between a primary device and a secondary device may be performed in at least two stages, a half-duplex stage when only the primary device transmits initialization signals and any encoded handshaking signals may be set to false, and a full-duplex stage when both devices may transmit initialization signals. The secondary device may perform polarity detection during the half-duplex stage. If the secondary device determines that the polarities of the received signals are reversed, the secondary device may reverse the polarities of any signals subsequently received from, and transmitted to, the primary device. In this manner, the polarities can be corrected for both devices during the half-duplex stage by the secondary device. The secondary device may initiate the full-duplex link initialization stage, during which any handshaking signals may be exchanged, by transmitting signals to the primary device.

20 Claims, 10 Drawing Sheets

(56) References Cited

U.S. PATENT DOCUMENTS

| | | | | |
|---|---|---|---|---|
| 5,390,356 | A * | 2/1995 | Houlberg | 703/23 |
| 5,412,783 | A * | 5/1995 | Skokan | 710/105 |
| 5,418,820 | A * | 5/1995 | Wincn | 375/340 |
| 5,432,775 | A * | 7/1995 | Crayford | 370/248 |
| 5,727,006 | A * | 3/1998 | Dreyer et al. | 714/820 |
| 6,141,350 | A * | 10/2000 | Mahale et al. | 370/438 |
| 6,212,225 | B1 * | 4/2001 | Agazzi | 375/220 |
| 6,215,816 | B1 * | 4/2001 | Gillespie et al. | 375/219 |
| 6,369,726 | B1 * | 4/2002 | Nagaraj et al. | 341/122 |
| 6,965,610 | B2 * | 11/2005 | Creigh | 370/465 |
| 7,477,694 | B2 * | 1/2009 | Sanderford et al. | 375/261 |
| 7,649,855 | B1 * | 1/2010 | Lo et al. | 370/278 |
| 7,672,367 | B1 * | 3/2010 | Kimpe et al. | 375/225 |
| 7,672,368 | B2 * | 3/2010 | Agazzi | 375/229 |
| 8,077,762 | B2 * | 12/2011 | Agazzi | 375/219 |
| 8,990,464 | B2 * | 3/2015 | Kessler | 710/104 |
| 2003/0016770 | A1 * | 1/2003 | Trans et al. | 375/346 |
| 2003/0081782 | A1 * | 5/2003 | Coles et al. | 380/260 |
| 2003/0206564 | A1 * | 11/2003 | Mills et al. | 370/528 |
| 2004/0105467 | A1 * | 6/2004 | Goodman | 370/910 |
| 2005/0157415 | A1 * | 7/2005 | Chiang et al. | 360/31 |
| 2005/0201305 | A1 * | 9/2005 | Shibata et al. | 370/282 |
| 2005/0201411 | A1 * | 9/2005 | Shibata et al. | 370/463 |
| 2007/0058705 | A1 * | 3/2007 | Wang et al. | 375/222 |
| 2007/0171966 | A1 * | 7/2007 | Light et al. | 375/232 |
| 2008/0019430 | A1 * | 1/2008 | Suzuki et al. | 375/150 |
| 2008/0186996 | A1 * | 8/2008 | Powell et al. | 370/448 |
| 2010/0042865 | A1 * | 2/2010 | Creigh | 713/503 |
| 2010/0054346 | A1 * | 3/2010 | Fukuda | 375/257 |
| 2010/0202329 | A1 * | 8/2010 | Nishioka et al. | 370/296 |
| 2011/0103224 | A1 * | 5/2011 | Nishioka et al. | 370/235 |
| 2012/0177087 | A1 * | 7/2012 | Konishi | 375/219 |
| 2012/0278656 | A1 * | 11/2012 | Berkhahn et al. | 714/37 |
| 2013/0101076 | A1 * | 4/2013 | Barner | 375/368 |
| 2013/0238825 | A1 * | 9/2013 | Hiraoka et al. | 710/110 |
| 2014/0112176 | A1 * | 4/2014 | Lin et al. | 370/252 |

FOREIGN PATENT DOCUMENTS

| | | |
|---|---|---|
| EP | 1171982 A1 | 1/2002 |
| JP | S5466009 | 5/1979 |

OTHER PUBLICATIONS

"DP83861 EN Gig PHYTER 10/100/1000 Ethernet Physical Layer," National Semiconductor, Oct. 2009.

Desanti, "Proposed FC-BaseT PCS," Apr. 2006, T11/06-026v1.

Noseworthy, "Gigabit Ethernet 1000BASE-T Tutorial", IOL Gigabet Ethernet Conference, Nov. 19, 1998.

Patwardhan, "Gigabit Ethernet over Copper: Hardware Architecture and Operation," Power Solutions, 2001, pp. 97-100.

* cited by examiner

| Sc | Sd (rcvr not OK) | A | B | A (pol=1) | B (pol=1) | Sd (rcvr OK) | A | B |
|---|---|---|---|---|---|---|---|---|
| 000 | 000 | -1 | 0 | 1 | 0 | 100 | 1 | 0 |
| 001 | 001 | 0 | 1 | 0 | -1 | 101 | 0 | -1 |
| 010 | 010 | -1 | 1 | 1 | -1 | 110 | 1 | -1 |
| 011 | 011 | 0 | 1 | 0 | -1 | 111 | 0 | -1 |
| 100 | 100 | 1 | 0 | -1 | 0 | 000 | -1 | 0 |
| 101 | 101 | 0 | -1 | 0 | 1 | 001 | 0 | 1 |
| 110 | 110 | 1 | -1 | -1 | 1 | 010 | -1 | 1 |
| 111 | 111 | 0 | -1 | 0 | 1 | 011 | 0 | 1 |

FIG. 9

POLARITY DETECTION SYSTEM

CROSS-REFERENCE TO RELATED APPLICATIONS

The present application claims the benefit of U.S. Provisional Patent Application Ser. No. 61/718,140, entitled "Polarity Detection System," filed on Oct. 24, 2012, which is hereby incorporated by reference in its entirety for all purposes.

TECHNICAL FIELD

The present description relates generally to a polarity detection system, and more particularly, but not exclusively, to an encoder independent polarity detection system.

BACKGROUND

The Ethernet networking protocol has become one of the most common networking protocols in use today. Due to the wide availability of Ethernet, and its large install base, Ethernet is generally able to provide a greater cost performance than other networking protocols. Accordingly, there has been a recent demand for implementations of Ethernet interfaces across a wide array of industries. Ethernet transmissions generally transmit data over at least one twisted pair of wires. A twisted pair of wires, or a "twisted pair," may refer to a type of cabling where two conductors of a single circuit are twisted together.

If the Ethernet cable connection between two electronic devices is crossed, e.g. the twisted pair is swapped, the polarity of the symbols transmitted over the twisted pair may be reversed and a receiving device may be unable to properly decode received symbols. Thus, a transmitting device may implement an encoding scheme to embed polarity information in the symbol mapping, in addition to other handshaking signals, so that a receiving device may perform polarity detection, in addition to detecting the other handshaking signals. Accordingly, the polarity detection by the receiving device may be dependent upon, and/or sensitive to, the encoding scheme implemented by the transmitting device, and any additional handshaking signals encoded therein.

BRIEF DESCRIPTION OF THE DRAWINGS

Certain features of the subject technology are set forth in the appended claims. However, for purpose of explanation, several embodiments of the subject technology are set forth in the following figures.

FIG. 9 illustrates an example polarity information table for a polarity detection system in accordance with one or more implementations.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced using one or more implementations. In one or more instances, structures and components are shown in block diagram form in order to avoid obscuring the concepts of the subject technology.

In the subject system for polarity detection, link initialization between a primary (clock master) device and a secondary (clock slave) device is performed in two stages, a half-duplex stage when only the primary device transmits symbols, such as training/idle symbols, and a full-duplex stage when both devices transmit symbols. During the half-duplex stage, only the primary device transmits symbols, such as training/idle symbols, and any encoded handshaking signals are set to false (or some other value known in advance by the secondary device). Thus, during the half-duplex stage the secondary device can assume that the value of any encoded handshaking signal is false, and therefore the secondary device does not need to detect any encoded handshaking signals in the transmitted symbols. As a result, the complexity of performing the polarity detection by the secondary device during the half-duplex stage may be significantly reduced. Furthermore, the polarity detection may be performed during the half-duplex stage by the secondary device independent of the encoding scheme used by the primary device, e.g. to encode any handshaking signals, and independent of the complexity thereof, e.g. since the values of any handshaking signals do not need to be detected by the secondary device during the half-duplex stage.

Thus, in the subject system for polarity detection the secondary device may perform polarity detection during the half-duplex stage, while any encoded handshaking signals are set to false. If the secondary device determines that the polarity is reversed, the secondary device may reverse the polarity of any symbols subsequently received from the primary device, and the secondary device may reverse the polarity of any symbols subsequently transmitted to the primary device. In this manner, the polarity can be corrected at the secondary device for both the primary device and the secondary device. The secondary device may then initiate the full-duplex link initialization stage by transmitting data to the primary device, during which the handshaking signals may be exchanged.

Figure 1:
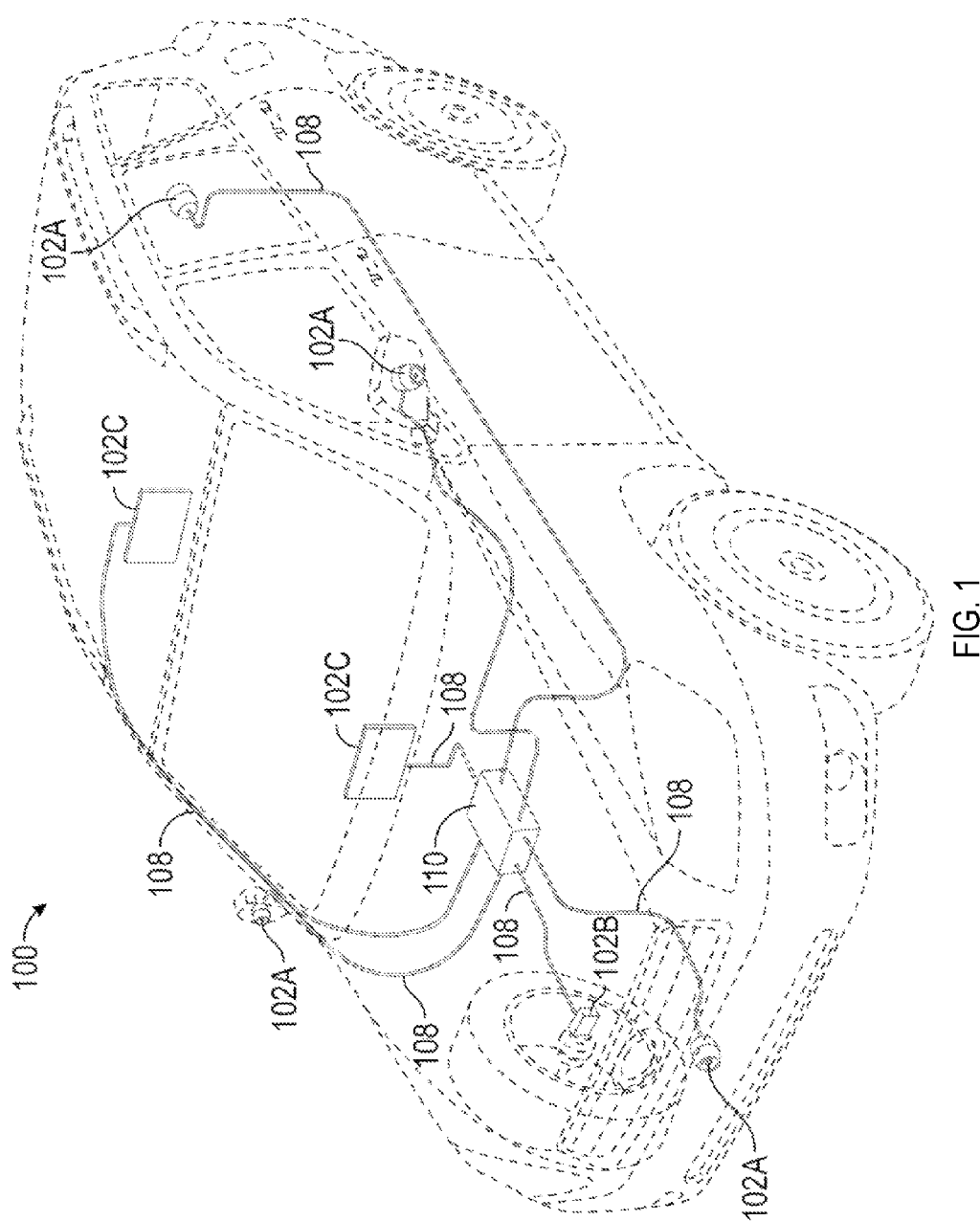
FIG. 1 illustrates an example network environment in which a polarity detection system may be implemented in accordance with one or more implementations.

FIG. 1 illustrates an example network environment 100 in which a polarity detection system may be implemented in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The example network environment 100 may include a number of electronic devices 102A-C that are coupled to a network device 110 via the transmission lines 108. The network device 110 may communicably couple the electronic devices 102A-C to one another. In one or more implementations, one or more of the electronic devices 102A-C may be communicatively coupled directly to one another, such as without the support of the network device 110. In one or more implementations, one or more of the transmission lines 108 may be Ethernet transmission lines, such as one or more twisted pair of wires. The network device 110 may be, or may include, a switch device, a routing device, a hub device, or generally any device that may communicably couple the electronic devices 102A-C. In one or more implementations, any of the electronic devices 102A-C may include, or may be, the electronic system 1000 of FIG. 10.

In one or more implementations, at least a portion of the example network environment 100 may be implemented within a vehicle, such as a car. For example, the electronic devices 102A-C may include, or may be coupled to, various systems within a vehicle, such as a powertrain system, a chassis system, a telematics system, an entertainment system, a camera system, a sensor system, such as a lane departure system, a diagnostics system, or generally any system that may be used in a vehicle. In FIG. 1, the electronic devices 102A are depicted as camera devices, such as forward-view, rear-view and side-view cameras, the electronic device 102B is depicted as an on-board diagnostics system, and the electronic devices 102C are depicted as entertainment systems. In one or more implementations, the network device 110 and/or one or more of the electronic devices 102A-C may be communicatively coupled to a public communication network, such as the Internet.

In one or more implementations, the electronic devices 102A-C may implement a physical layer (PHY) that is interoperable with one or more aspects of one or more physical layer specifications, such as those described in the Institute of Electrical and Electronics Engineers (IEEE) 802.3 Standards. In operation, a primary electronic device 102A may initiate a link initialization with a secondary electronic device 102B, such as across a twisted pair of wires. In one or more implementations, the primary electronic device 102A may be referred to as the "master" and the secondary electronic device 102B may be referred to as the "slave," because the primary electronic device 102A may provide a clock source for initializing the link with the secondary electronic device 102B.

In one or more implementations, the link initialization between the primary electronic device 102A and the secondary electronic device 102B may be a two-stage process. The first stage may be a half-duplex stage during which the primary electronic device 102A transmits symbols, such as training symbols, or idle symbols, to the secondary electronic device 102B, but the secondary electronic device 102B does not transmit any symbols to the primary electronic device 102A. The primary electronic device 102A may not transmit any handshaking signals during the half-duplex stage and/or any handshaking signals transmitted during the half-duplex stage may be set to a value known in advance by the secondary electronic device 102B, such as zero or false. The second stage of the link initialization may be a full-duplex stage during which both the primary electronic device 102A and the secondary electronic device 102B transmit symbols, and during which the handshaking signals may be exchanged.

Thus, during the half-duplex stage the secondary electronic device 102B is able to determine that variables that pertain to the hand-shaking signal status, such as rem_rcvr_status, are false or are equal to zero. The secondary electronic device 102B may use the known values of these the handshaking signals to simplify polarity detection during the half-duplex stage, as is discussed further below. If the secondary electronic device 102B determines that the polarities of the received symbols are reversed, the secondary electronic device 102B may change the signs of the received symbols, and of any symbols subsequently received from the primary electronic device 102A.

Upon completion of the half-duplex link initialization stage, the secondary electronic device 102B may initiate the full-duplex link initialization stage by transmitting symbols to the primary electronic device 102A. If the secondary electronic device 102B determined during the half-duplex link initialization stage that the polarities of the received symbols were reversed, the secondary electronic device 102B may change the signs of any symbols subsequently transmitted to the primary electronic device 102A. In this manner, the secondary electronic device 102B may handle the polarity correction for both electronic devices 102A-B during the half-duplex link initialization stage and transparent to the primary electronic device 102A.

Figure 2:
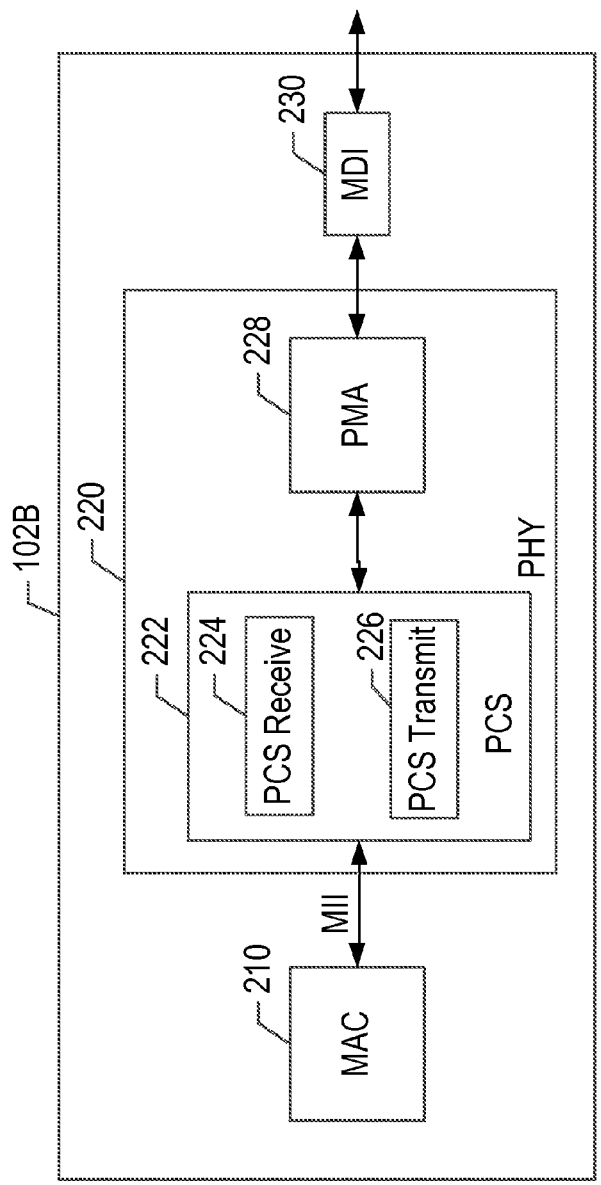
FIG. 2 illustrates an example electronic device that may implement a polarity detection system in accordance with one or more implementations.

FIG. 2 illustrates an example electronic device 102B that may implement a polarity detection system in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The example electronic device 102B includes a media access control (MAC) module 210, a physical layer (PHY) module 220, and a medium dependent interface (MDI) 230. The PHY module 220 includes a physical coding sublayer (PCS) module 222, and a physical medium attachment (PMA) module 228. The PCS module 222 includes a PCS receive module 224, and a PCS transmit module 226. In one or more implementations, the PCS receive module 224 may include, and/or may be referred to as, a PCS decoder, and the PCS transmit module 226 may include, and/or may be referred to as, a PCS encoder.

In one or more implementations, the MAC module 210 may be communicatively coupled to the PHY module 220 via a medium independent interface (MII), a gigabit medium independent interface (GMII), or any other interface. The interface may include transmit, receive, and clock signal lines. The PCS transmit module 226 may include one or more blocks that convert transmit data received from the MAC module 210 to symbols, such as pulse amplitude module (PAM) converted symbols, 4-bit to 5-bit (4B/5B) converted symbols, 4-bit to 3-bit (4B/3B) converted symbols, or generally any symbols, to be passed to the PMA module 228. The PCS transmit module 226 may also scramble the transmit data, e.g. to control the radiated emissions on the twisted pair cable, using a side-stream scrambler function that generates a data scrambling sequence. For example, the PCS transmit module 226 may scramble the unscrambled transmit data (UD) by performing an exclusive-or (XOR) operation on the unscrambled transmit data (UD) and a data scrambling sequence (N) to generate the scrambled transmit data (SD), e.g. SD=(UD⊕N). An example PCS transmit module 226 is discussed further below with respect to FIG. 3.

The PCS receive module 224 may include one or more blocks that convert received symbols from the PMA module 228 to receive data that is passed to the MAC module 210. If the receive data was scrambled by the transmitting device, e.g. the electronic device 102A, the PCS receive module 224 may unscramble the received data using the same side-stream scrambler function that was used by the electronic device 102A. For example, the PCS receive module 224 may descramble the received scrambled data by performing an exclusive-or (XOR) operation on the received scrambled data (SD) and the data scrambling sequence (N) to recover the unscrambled data (UD), e.g. UD=(SD⊕N). An example PCS receive module 224 is discussed further below with respect to FIG. 4.

Thus, in order for the electronic device 102B to properly unscramble data received from an electronic device 102A, the PCS receive module 224 of the electronic device 102B may need to utilize the same data scrambling sequence that was used by the PCS transmit module 226 of the electronic device 102A to scramble the data. Accordingly, the electronic devices 102A-B may perform a link initialization process, e.g. such that the electronic device 102B can lock a descrambler to the proper values of scrambler states for linkup with the electronic device 102A. In the subject system, the link initialization is a two-stage process, a first stage that is a half-duplex stage during which only the primary electronic device 102A transmits symbols and the secondary electronic device 102B performs polarity detection, and a second stage that is a full-duplex stage when both the primary electronic device 102A and the secondary electronic device 102B transmit symbols, with any polarity correction implemented by the secondary electronic device 102B. The link initialization process of the subject system is discussed further below, e.g. with respect to FIGS. 5-7.

The PMA module 228 may perform one or more functions to facilitate uncorrupted data transmission, such as adaptive equalization, echo and/or crosstalk cancellation, automatic gain control (AGC), etc. The MDI 230 may provide an interface from the PHY module 220 to the physical medium used to carry the transmission, e.g. the transmission lines 108. In one or more implementations, one or more of the MAC module 210, the PHY module 220, and the MDI 230, or one or more portions thereof, may be implemented in software (e.g., subroutines and code). In one or more implementations, one or more of the MAC module 210, the PHY module 220 and the MDI 230, or one or more portions thereof, may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both.

Figure 3:
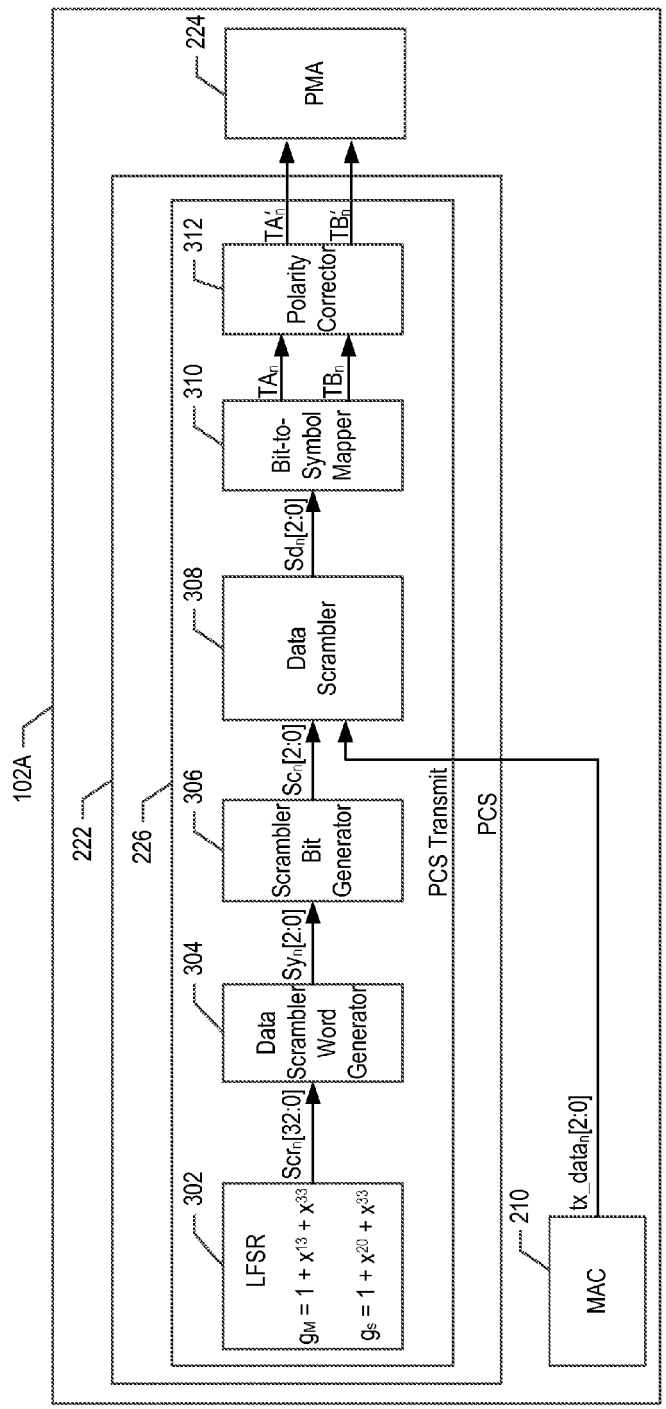
FIG. 3 illustrates an example physical coding sublayer (PCS) transmit module of an example electronic device that may implement a polarity detection system in accordance with one or more implementations.

FIG. 3 illustrates an example physical coding sublayer (PCS) transmit module 226 of an example electronic device 102A that may implement a polarity detection system in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The example electronic device 102A may include a PCS module 222 and a PMA module 228, e.g. that collectively form a PHY module 220, and a MAC module 210. The PCS module 222 may include a PCS transmit module 226 and a PCS receive module (not shown). The PCS transmit module 226 may include a linear feedback shift register (LFSR) module 302, a data scrambler word generator 304, a scrambler bit generator 306, a data scrambler 308, a bit-to-symbol mapper 310, and a polarity corrector 312. In one or more implementations, the PCS transmit module 226 may include additional modules (not shown), such as a processor, a controller, a sign scrambler word generator, a sign scrambler nibble generator, a symbol sign scrambler, a convolutional encoder, or generally any other module that may facilitate the operations of the PCS transmit module 226.

In operation, the LFSR module 302 selects a scrambler generator polynomial equation based at least on whether the electronic device 102A is operating as the primary device, e.g. master device, or the secondary device, e.g. slave device. As previously discussed, any of the electronic devices 102A-C may operate as the master device or the secondary device, and such designation refers to the electronic device that provides the clock source for the initialization. If the electronic device 102A is operating as the primary device, the LFSR module 302 utilizes the polynomial equation of $g_m(x)= 1+x^{13}+x^{33}$ (eq. 1). If the electronic device 102A is operating as the secondary device, the LFSR module 302 utilizes the polynomial equation of $g_s(x)=1+x^{20}+x^{33}$ (eq. 2). The polynomial equations used by the LFSR module 302 are discussed further below with respect to FIG. 8.

The LFSR module 302 may be reset upon PCS reset, e.g. initiation of the link initialization, and the initial value of the LFSR module 302 may be any value except all zeros. The LFSR module 302 may generate a scrambler sequence $Scr_n[32:0]$ and may provide the scrambler sequence to the data scrambler word generator 304. The subscript "n" may represent a time index that establishes a temporal relationship between different symbol periods. The data scrambler word generator 304 may use the LFSR module 302 output of $Scr_n[32:0]$ to generate a scrambler word, e.g., $Sy_n[2:0]$. In one or more implementations, the data scrambler word generator 304 may generate the bits of $Sy_n[2:0]$ (with ⊕ representing an exclusive-or (XOR) logic operation) as follows:

$Sy_n[0]=Scr_n[0]$ $Sy_n[1]=g(Scr_n[0])=Scr_n[3]\oplus Scr_n[8]$ $Sy_n[2]=g^2(Scr_n[0])=Scr_n[6]\oplus Scr_n[16]$ \hfill (eq. 3)

The data scrambler word generator 304 provides $Sy_n[2:0]$ to the scrambler bit generator 306. The scrambler bit generator 306 uses $Sy_n[2:0]$ and one or more other signals, such as tx_mode (transmit mode), tx_enable (transmit enable), to generate $Sc_n[2:0]$. The tx_mode signal may indicate whether the PCS transmit module 226 is transmitting training symbols, e.g. idles (SEND_I), is transmitting zeros (SEND_Z), or is transmitting idles/data symbols (SEND_N). The tx_enable single may indicate that data transmission is occurring (when asserted) or that data transmission is not occurring (when not asserted). In one or more implementations, the scrambler bit generator 306 may generate the bits of $Sc_n[2:0]$ as follows:

$$Sc_n[2:1] = \begin{bmatrix} [0\ 0] & \text{if (tx\_mode = SEND\_Z)} \\ Sy_n[2:1] & \text{else} \end{bmatrix} \quad (\text{eq. 4})$$

$$Sc_n[0] = \begin{bmatrix} 0 & \text{if (tx\_mode = SEND\_Z)} \\ Sy_n[0] & \text{else} \end{bmatrix}$$

The scrambler bit generator 306 provides $Sc_n[2:0]$ to the data scrambler 308. The data scrambler 308 uses $Sc_n[2:0]$ to eliminate the correlation of transmit data $tx\_data_n[2:0]$, e.g. received from the MAC module 210, and to generate idle and training symbols. The data scrambler 308 generates $Sd_n[2:0]$ from the output of the scrambler bit generator 306, $Sc_n[2:0]$, and $tx\_data_n[2:0]$ (after 4B3B conversion, or any other conversion). In one or more implementations, the data scrambler 308 may generate $Sd_n[2:0]$ as follows:

$$Sd_n[2] = \begin{bmatrix} Sc_n[2] \oplus tx\_data_n[2] & \\ Sc_n[2] \oplus 1 & \text{if (tx\_enable}_{n-3} = 1) \\ Sc_n[2] & \text{else if (loc\_rcvr\_status = OK)} \\ & \text{else} \end{bmatrix} \quad (\text{eq. 5})$$

$$Sd_n[1:0] = \begin{bmatrix} Sc_n[1:0] \oplus \\ tx\_data_n[1:0] & \text{if (tx\_enable}_{n-3} = 1) \\ Sc_n[1:0] & \text{else} \end{bmatrix}$$

In one or more implementations, the loc_rcvr_status variable may be a handshaking signal that is set to zero, false, or not ok, during the half-duplex stage of the link initialization process.

The data scrambler 308 provides $Sd_n[2:0]$ to the bit-to-symbol mapper 310. The bit-to-symbol mapper 310 uses the bits of $Sd_n[2:0]$ to generate a ternary vector $(TA_n, TB_n)$. In one or more implementations, during the half-duplex stage of the link initialization the bit-to-symbol mapper 310 may use the idle symbol mapping for training indicated in Table 1 below to generate the ternary vector $(TA_n, TB_n)$ from the bits of $Sd_n[2:0]$.

TABLE 1

Idle symbol mapping in training

| Sdn[2:0] | Ternary A | Ternary B |
|---|---|---|
| 0 | −1 | 0 |
| 1 | 0 | 1 |
| 2 | −1 | 1 |
| 3 | 0 | 1 |
| Used for SSD/ESD | 0 | 0 |
| 4 | 1 | 0 |
| 5 | 0 | −1 |
| 6 | 1 | −1 |
| 7 | 0 | −1 |

The bit-to-symbol mapper 310 provides $TA_n$, $TB_n$ to the polarity corrector 312. When the electronic device 102A is operating as a secondary device, the polarity corrector 312 determines whether polarity was previously detected as being reversed, as is discussed further below with respect to FIGS. 4 and 5. For example, the electronic device 102A may set a bit when the polarity is detected as reversed. If the electronic device 102A is operating as a secondary device, and the polarity was previously detected as reversed, the polarity corrector 312 reverses the signs of $TA_n$, $TB_n$ to generate $TA'_n$, $TB'_n$. If the electronic device 102A is operating as the secondary device, and the polarity was not previously detected as reversed, the polarity corrector 312 does not change the signs of $TA_n$, $TB_n$, and therefore the output of the polarity corrector 312, $TA'_n$, $TB'_n$, is equivalent to $TA_n$, $TB_n$. Similarly, if the electronic device 102A is operating as the primary device, the polarity corrector 312 does not alter the signs of the $TA_n$, $TB_n$ (since the polarity correction will be performed by the secondary device when the corresponding $RA_n$, $RB_n$ symbols are received), and therefore the output of the polarity corrector 312, $TA'_n$, $TB'_n$, is equivalent to $TA_n$, $TB_n$. The polarity corrector 312 provides $TA'_n$, $TB'_n$ to the PMA module 228 for further processing and subsequent transmission, e.g. via the MDI 230.

Figure 4:
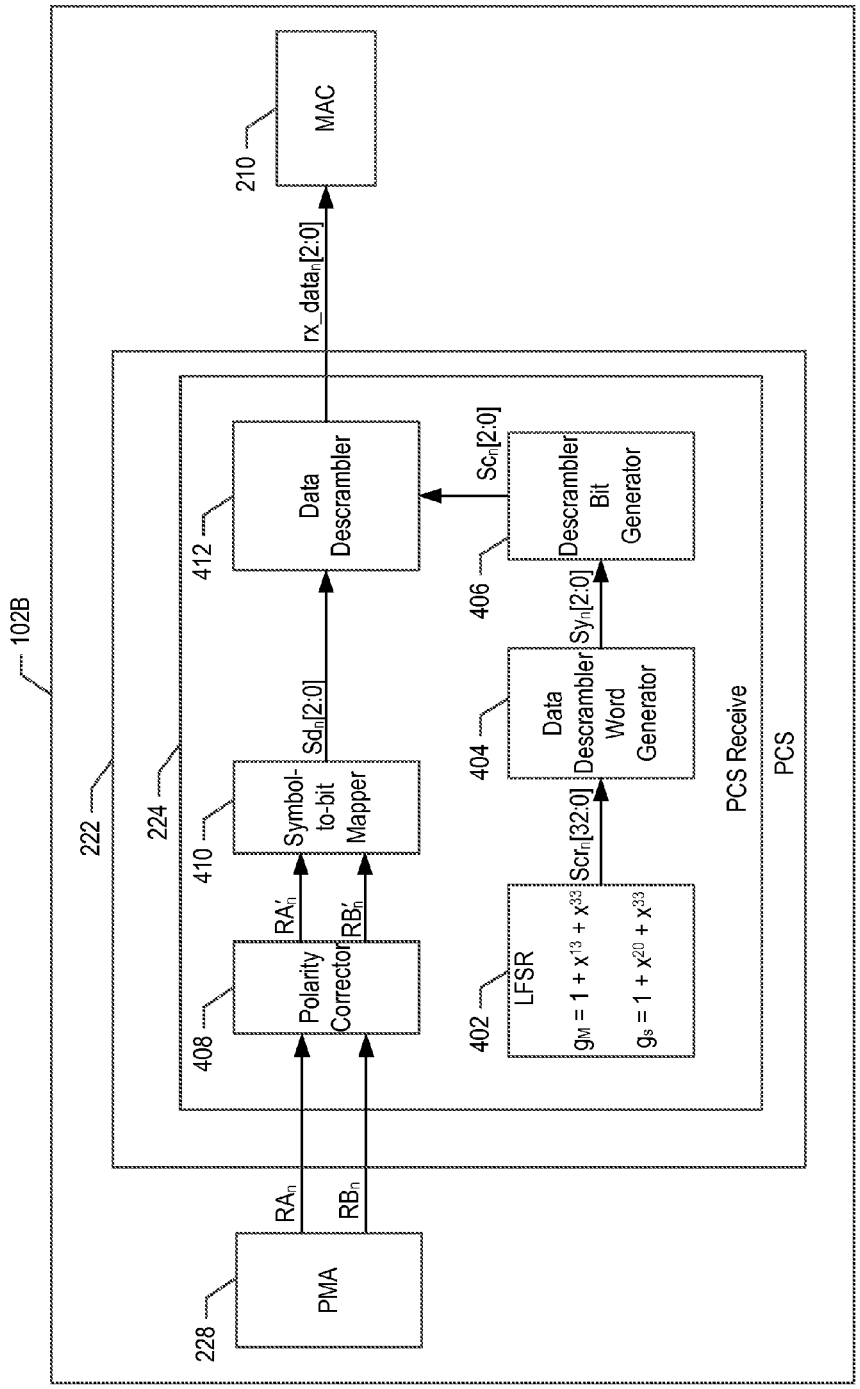
FIG. 4 illustrates an example physical coding sublayer (PCS) receive module of an example electronic device that may implement a polarity detection system in accordance with one or more implementations.

FIG. 4 illustrates an example physical coding sublayer (PCS) receive module 224 of an example electronic device 102B that may implement a polarity detection system in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The electronic device 102B includes the MAC module 210, the PCS module 222, and the PMA module 228. The PCS module 222 includes the PCS receive module 224 and a PCS transmit module (not shown). The PCS receive module 224 may include a LFSR module 402, a data descrambler word generator 404, a descrambler bit generator 406, a data descrambler 412, a polarity corrector 408, and a symbol-to-bit mapper 410. In one or more implementations, the PCS receive module 224 may include additional modules (not shown), such as a processor, a controller, or generally any other module that may facilitate the operations of the PCS receive module 224.

In operation, the LFSR module 402 of the PCS receive module 224 of the electronic device 102B selects a scrambler generator polynomial equation based at least on whether the transmitting electronic device, e.g. the electronic device 102A, is operating as the primary device, e.g. master device, or the secondary device, e.g. slave device. As previously discussed, any of the electronic devices 102A-C may operate as the master device or the secondary device, and such designation refers to the electronic device 102A that provides the clock source for the initialization. If the transmitting electronic device 102A is operating as the primary device, the LFSR module 402 of the PCS receive module 224 of the electronic device 102B utilizes the polynomial equation of $g_m(x)=1+x^{13}+x^{33}$ (eq. 1). If the electronic device 102A is operating as the secondary device, the LFSR module 402 of the PCS receive module 224 of the electronic device 102B utilizes the polynomial equation of $g_s(x)=1+x^{20}+x^{33}$ (eq. 2). The polynomial equations used by the LFSR module 402 are discussed further below with respect to FIG. 8.

The LFSR module 402, data descrambler word generator 404, and the descrambler bit generator 406 of the PCS receive module 224 may operate in the same manner, and/or similar manner, as discussed above with respect to the LFSR module 302, the data scrambler word generator 304, and the scrambler bit generator 306, respectively, of the PCS transmit module 226. In this manner, when the PCS receive module 224 of the electronic device 102B completes the scrambler lock process, the PCS receive module 224 of the electronic device 102B can generate the same scrambling sequence as the PCS transmit module 226 of the transmitting electronic device 102A.

In operation, the PMA module 228 provides processed received symbols $RA_n$, $RB_n$ to the polarity corrector 408 of the PCS receive module 224. If the electronic device 102B is operating as a secondary device, and the polarity was previously detected as reversed, the polarity corrector 408 reverses the signs of $RA_n$, $RB_n$ to generate $RA'_n$, $RB'_n$. If the electronic device 102B is operating as the secondary device, and the polarity was not previously detected as reversed, the polarity corrector 408 does not change the signs of $RA_n$, $RB_n$, and therefore the output of the polarity corrector 408, $RA'_n$, $RB'_n$, is equivalent to $RA_n$, $RB_n$. Similarly, if the electronic device 102B is operating as the primary device, the polarity corrector 408 does not alter the signs of the $RA_n$, $RB_n$ (since the polarity correction will be performed by the secondary device when the corresponding $TA_n$, $TB_n$ symbols are transmitted), and therefore the output of the polarity corrector 408, $RA'_n$, $RB'_n$, is equivalent to $RA_n$, $RB_n$. The polarity corrector 408 provides $RA'_n$, $RB'_n$ to the symbol-to-bit mapper 410.

The symbol-to-bit mapper 410 maps the ternary vector $(RA'_n, RB'_n)$ to bits of $Sd_n[2:0]$ based on a table mapping. In one or more implementations, during the half-duplex stage of the link initialization the symbol-to-bit mapper 410 may use the idle symbols mapping for training indicated in Table 1 above to map the ternary vector $(RA'_n, RB'_n)$ to bits of $Sd_n[2:0]$. The bits of $Sd_n[2:0]$ are then provided to the data descrambler 412 to be descrambled using the bits $Sc_n[2:0]$ that are provided by the descrambler bit generator 406 to generate the bits of $rx\_data_n[2:0]$. For example, the data descrambler 412 may reverse the XOR operations performed by the data scrambler 308, e.g. by performing an XOR operation on the bits of $Sd_n[2:0]$ and $Sc_n[2:0]$, while taking into account any handshaking signals, or any other signals, encoded in the scrambled bits, e.g. as listed above in eq. 5. The descrambled bits of $rx\_data_n[2:0]$ are then provided to the MAC module 210 for further processing.

During the half-duplex stage of the link initialization, if the electronic device 102B is operating as the secondary device and the electronic device 102A is operating as the primary device, the secondary electronic device 102B performs the scrambler lock process to lock the data scrambling sequence used by the data descrambler 412 of the secondary electronic device 102B to the data scrambling sequence used by the data scrambler 308 of the primary electronic device 102A. The primary electronic device 102A may initiate the LFSR module 302 of the PCS transmit module 226 and may begin transmitting training symbols, e.g. as indicated in the training symbol sequence of Table 1 above. Thus, the primary electronic device 102A may transmit symbols $TA_n$, $TB_n$ (with no polarity correction applied) which, assuming no corruption, should be the same as the symbols $RA_n$, $RB_n$ received by the secondary electronic device 102B.

As shown in equations 3-5 above, when the primary electronic device 102A is transmitting training symbols, the bits generated by the primary electronic device 102A for $Scr_n[0]=Sy_n[0]=Sc_n[0]=Sd_n[0]$. As indicated in Table 1 above, when $Sd_n[0]$ equals 0, $TA_n$ equals either +1 or −1; otherwise $TA_n$ equals 0. Thus, the first bit generated by the data scrambler 308 of the primary electronic device 102A can be decoded by the secondary electronic device 102B based on the value of $RA_n$ (which should equal $TA_n$). The decoded bit can then be fed to the shift registers of the LFSR module 402 of the secondary electronic device 102B to achieve reliable state acquisition. Once reliable state acquisition has been achieved, for every symbol cycle, the bit of $Scr_n[0]$ that is generated by the LFSR module 402 of the secondary electronic device 102B can be used as a reference bit to compare with the processed $RA_n$ received from the primary electronic device 102A. Continuous consistency within a certain period indicates that the LFSR module 402 of the secondary electronic device 102B has been locked to the LFSR module 302 of the primary electronic device 102A and consequently the data descrambler 412 of the secondary electronic device 102B has been locked to the data scrambler 308 of the primary electronic device 102A.

However, if the polarity of the received symbols is reversed, the data descrambler 412 of the secondary electronic device 102B may be unable to lock to the data scrambler 308 of the primary electronic device 102A within the certain period of time. Thus, if the data descrambler 412 cannot lock to the data scrambler 308 within the certain period of time, the polarity corrector 408 of the electronic device 102B may reverse the polarity of the received symbols and re-attempt, e.g. restart, the process of locking the data descrambler 412 of the secondary electronic device 102B to the data scrambler 308 of the primary electronic device 102A. If the data descrambler 412 of the electronic device 102B is still unable to lock to the data scrambler 308 of the electronic device 102A within the certain period of time, then a wrong boundary may have been taken for $RA_n$, $RB_n$. Thus, the electronic device 102B may use a different boundary for $RA_n$, $RB_n$ and re-attempt, e.g. restart, the process of locking the data descrambler 412 of the electronic device 102B to the data scrambler 308 of the electronic device 102A. Since there are two polarity possibilities and two boundary possibilities, the secondary electronic device 102B may cycle through each possibility in turn, e.g. in a recursive process, until a certain period of consistency is achieved between the received symbols and the derived symbols.

If the secondary electronic device 102B determines that the polarity is reversed during the scrambler lock process, the electronic device 102B changes the polarities, e.g. the signs, of any subsequently received signals ($RA_n$, $RB_n$), and any subsequently transmitted signals ($TA_n$, $TB_n$). Thus, when the secondary electronic device 102B initiates the full-duplex stage of the link initialization process, the polarity should be observed as unflipped, e.g. correct, by the primary electronic device 102A. Accordingly, the polarity detection can be performed by the PCS receive module 224 of the secondary electronic device 102B independent of the encoding scheme used to encode handshaking signals, and/or other signals, by the PCS transmit module 226 of the primary electronic device 102A.

Since the electronic devices 102A-B operate in the half-duplex stage of the initialization process while the scrambler lock process is occurring, any handshaking signals, such as rem_rcvr_status or loc_rcvr_status used to determine $Sd_n[0]$ in equation 5 above, are set to zero, false, or not ok, which may be known in advance by both electronic devices 102A-B. In this manner, the variables corresponding to the signals can be effectively removed from the above equations, thereby reducing the complexity of determining the correct polarity and/or the correct boundary. However, if the values of the handshaking signals were unknown, the search space may have to be enlarged by $2^n$, with n being the number of handshaking signals. For example, if the value of loc_rcvr_status was unknown, then the search space would have to be enlarged to account for the loc_rcvr_status possible values (e.g. 0 or 1), in addition to the two polarity possibilities and the two boundary possibilities, resulting in eight total possibilities. The search complexity added by handshaking signals is discussed further below with respect to FIG. 9.

Figure 5:
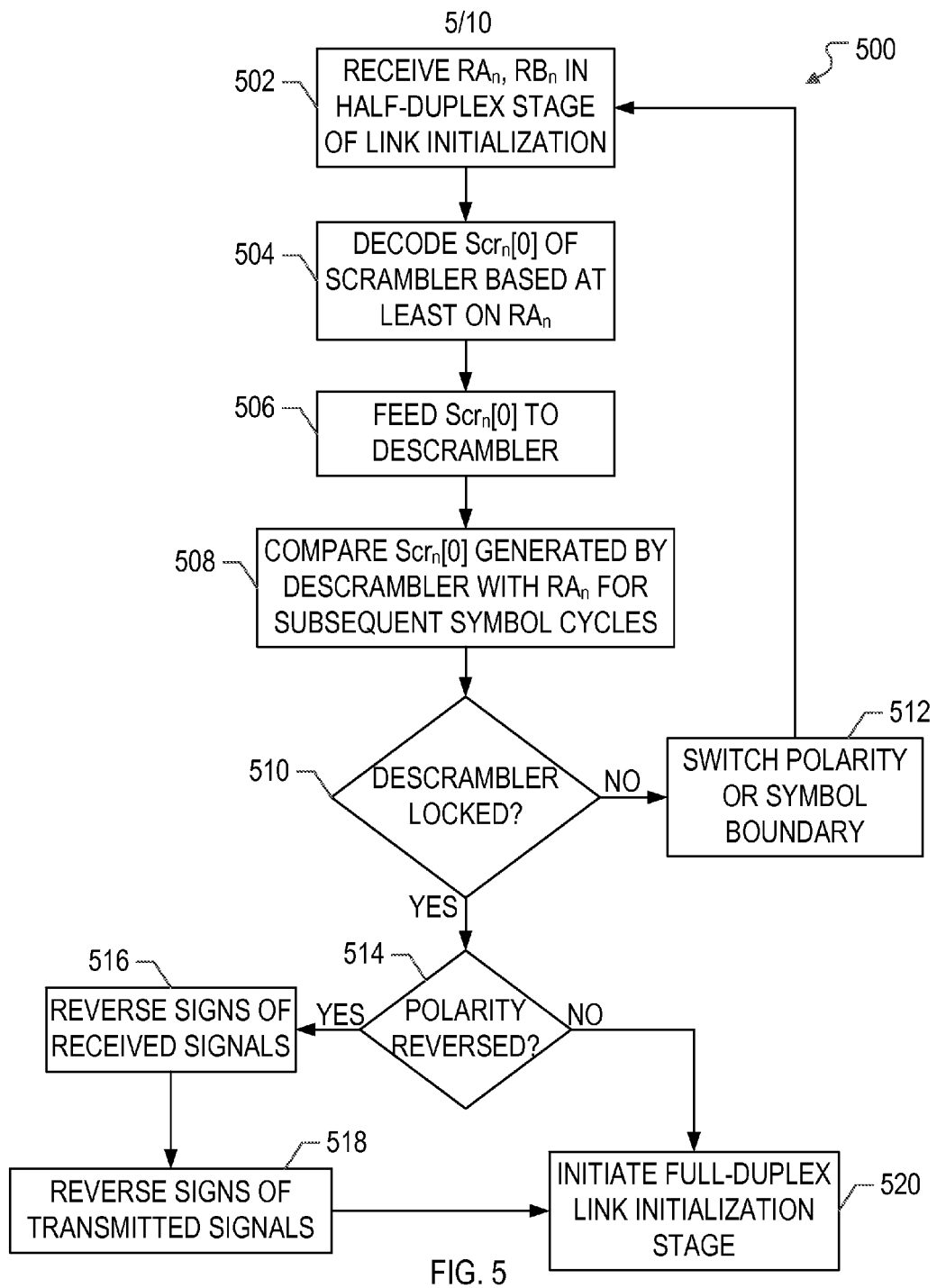
FIG. 5 illustrates a flow diagram of an example process of an example secondary electronic device implementing a polarity detection system in accordance with one or more implementations.

FIG. 5 illustrates a flow diagram of an example process of an example secondary electronic device 102B implementing a polarity detection system in accordance with one or more implementations. For explanatory purposes, the example process 500 is described herein with reference to the electronic devices 102A-B of FIG. 1; however, the example process 500 is not limited to the electronic devices 102A-B of FIG. 1, and the example process 500 may be performed by one or more components of one or more of the electronic devices 102A-B, such as the PCS receive module 224 of the electronic device 102B and the PCS transmit module 226 of the electronic device 102A. Further for explanatory purposes, the blocks of the example process 500 are described herein as occurring in serial, or linearly. However, multiple blocks of the example process 500 may occur in parallel. In addition, the blocks of the example process 500 need not be performed in the order shown and/or one or more of the blocks of the example process 500 need not be performed.

A secondary electronic device 102B receives symbols $RA_n$, $RB_n$ from a primary electronic device 102A over one or more twisted pairs of wires during a half-duplex stage of a link initialization process (502). Since the link initialization stage is half-duplex, the secondary electronic device 102B may not transmit any signals to the primary electronic device 102A during the half-duplex stage. Furthermore, the primary electronic device 102A may set any handshaking signals encoded in the received symbols $RA_n$, $RB_n$ to, e.g., false, and the secondary electronic device 102B may expect any handshaking signals encoded in the received symbols $RA_n$, $RB_n$ to be set to, e.g., false. The secondary electronic device 102B decodes $Scr_n[0]$ of the data scrambler 308 of the PCS transmit module 226 of the primary electronic device 102A based at least on $RA_n$ (504). For example, as indicated in Table 1 above, when $Sd_n[0]$ equals 0, $RA_n$ equals either +1 or −1; otherwise $RA_n$ equals 0.

The secondary electronic device 102B feeds the decoded $Scr_n[0]$ of the data scrambler 308 of the primary electronic device 102A to the shift registers of the LFSR module 402 of the PCS receive module 224 of the secondary electronic device 102B (506). The secondary electronic device 102B compares the $Scr_n[0]$ generated by the LFSR module 402 with the received $RA_n$ for subsequent symbol cycles (508). The secondary electronic device 102B determines whether the data descrambler 412 of the PCS receive module 224 of the secondary electronic device 102B has been locked to the data scrambler 308 of the PCS transmit module 226 of the primary electronic device 102A (510). In one or more implementations, the secondary electronic device 102B may determine that the data descrambler 412 has been locked based at least on whether a continuous consistency is achieved between the $Scr_n[0]$ generated by the LFSR module 402 and the received $RA_n$ for a threshold amount of time, such as a threshold number of symbol cycles.

If the secondary electronic device 102B determines that the data descrambler 412 has not been locked, the secondary electronic device 102B adjusts the symbol boundary of $RA_n$, $RB_n$, or the secondary electronic device 102B reverses the polarity of $RA_n$, $RB_n$, and repeats the data descrambler 412 locking process (512). The secondary electronic device 102B may attempt to lock the data descrambler 412 using the different symbol boundary and polarity combinations until the data descrambler 412 can be locked (510).

Once the data descrambler 412 has been locked (510), the secondary electronic device 102B determines whether the polarities of the received signals were reversed in order to lock the data descrambler 412 (514). If the polarities were reversed (514), the secondary electronic device 102B reverses the signs of any subsequently received signals from the primary electronic device 102A (516) and reverses the signs of any subsequently transmitted signals to the primary electronic device 102A (518). In this manner, the secondary electronic device 102B can correct the polarity on behalf of both of the electronic devices 102A-B. In one or more implementations, the secondary electronic device 102B may configure the polarity corrector 408 of the PCS receive module 224 of the secondary electronic device 102B to reverse the signs of any signals subsequently received from the primary electronic device 102A. Similarly, the secondary electronic device 102B may configure the polarity corrector 312 of the PCS transmit module 226 of the secondary electronic device 102B to reverse the signs of any signals subsequently transmitted to the primary electronic device 102A. The secondary electronic device 102B may initiate the full-duplex stage of the link initialization process (520), e.g. by transmitting data to the primary electronic device 102A.

Figure 6:
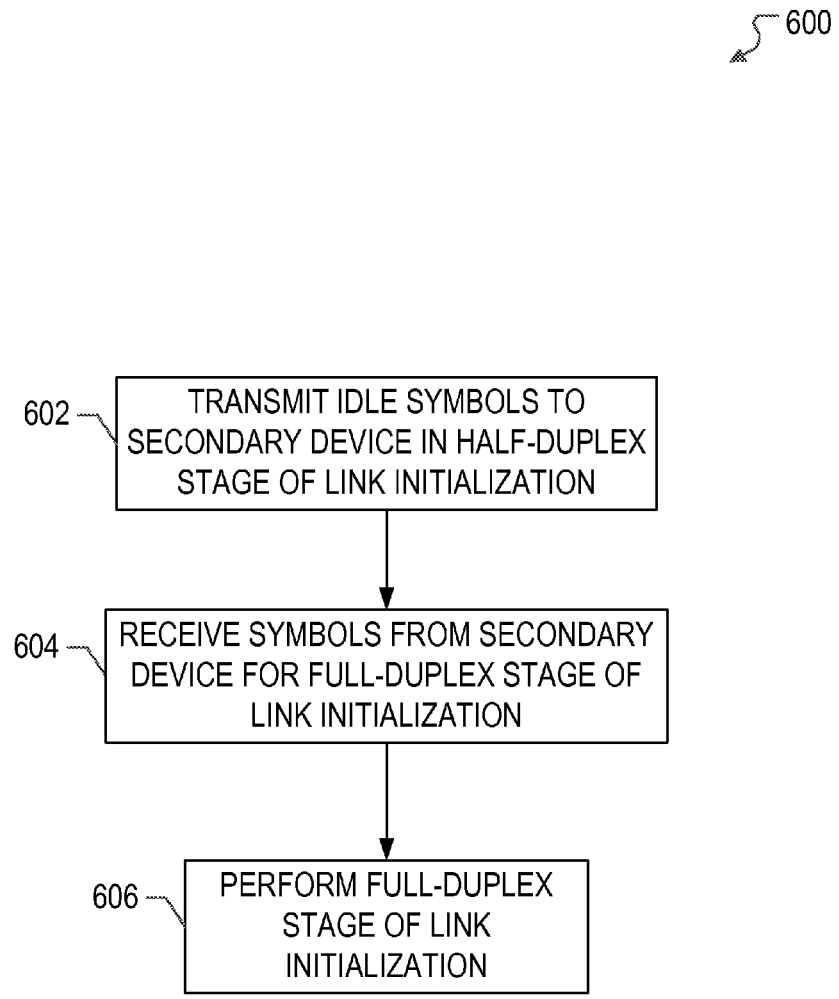
FIG. 6 illustrates a flow diagram of an example process of an example primary electronic device that is in communication with an example secondary device implementing a polarity detection system in accordance with one or more implementations.

FIG. 6 illustrates a flow diagram of an example process 600 of an example primary electronic device 102A that is in communication with an example secondary electronic device 102B implementing a polarity detection system in accordance with one or more implementations. For explanatory purposes, the example process 600 is described herein with reference to the electronic devices 102A-B of FIG. 1; however, the example process 600 is not limited to the electronic devices 102A-B of FIG. 1, and the example process 600 may be performed by one or more components of one or more of the electronic devices 102A-B, such as the PCS receive module 224 of the electronic device 102B and the PCS transmit module 226 of the electronic device 102A. Further for explanatory purposes, the blocks of the example process 600 are described herein as occurring in serial, or linearly. However, multiple blocks of the example process 600 may occur in parallel. In addition, the blocks of the example process 600 need not be performed in the order shown and/or one or more of the blocks of the example process 600 need not be performed.

A primary electronic device 102A transmits a clock source and idle symbols, e.g. training symbols, to a secondary electronic device 102B during a half-duplex stage of a link initialization process (602). Since the link initialization stage is half-duplex, the primary electronic device 102A may not receive any signals from the secondary electronic device 102B. Furthermore, the primary electronic device 102A may set any handshaking signals encoded in the transmitted symbols $TA_n$, $TB_n$ to, e.g., false, and the secondary electronic device 102B may expect any handshaking signals encoded in the received symbols $RA_n$, $RB_n$ to be set to, e.g., false. If the polarities of one or more twisted pair of wires over which the signals are received are reversed, the secondary electronic device 102B performs polarity correction during the half-duplex link initialization stage, without transmitting any link initialization information to the primary electronic device 102A.

Upon completion of the half-duplex link initialization stage, the primary electronic device 102A may receive symbols from the secondary electronic device 102B that indicate the initiation of a full-duplex stage of the link initialization (604). The primary electronic device 102A performs the full-duplex stage of the link initialization in conjunction with the secondary electronic device 102B (606). In the full-duplex link initialization stage, the primary electronic device 102A may receive link initialization information, such as handshaking signals, from, and may transmit link initialization information to, the secondary electronic device 102B over one or more twisted pair of wires. Since any polarity correction is performed by the secondary electronic device 102B during the half-duplex link initialization stage, polarity correction does not need to be addressed by the primary electronic device 102A during the full-duplex link initialization stage.

Figure 7:
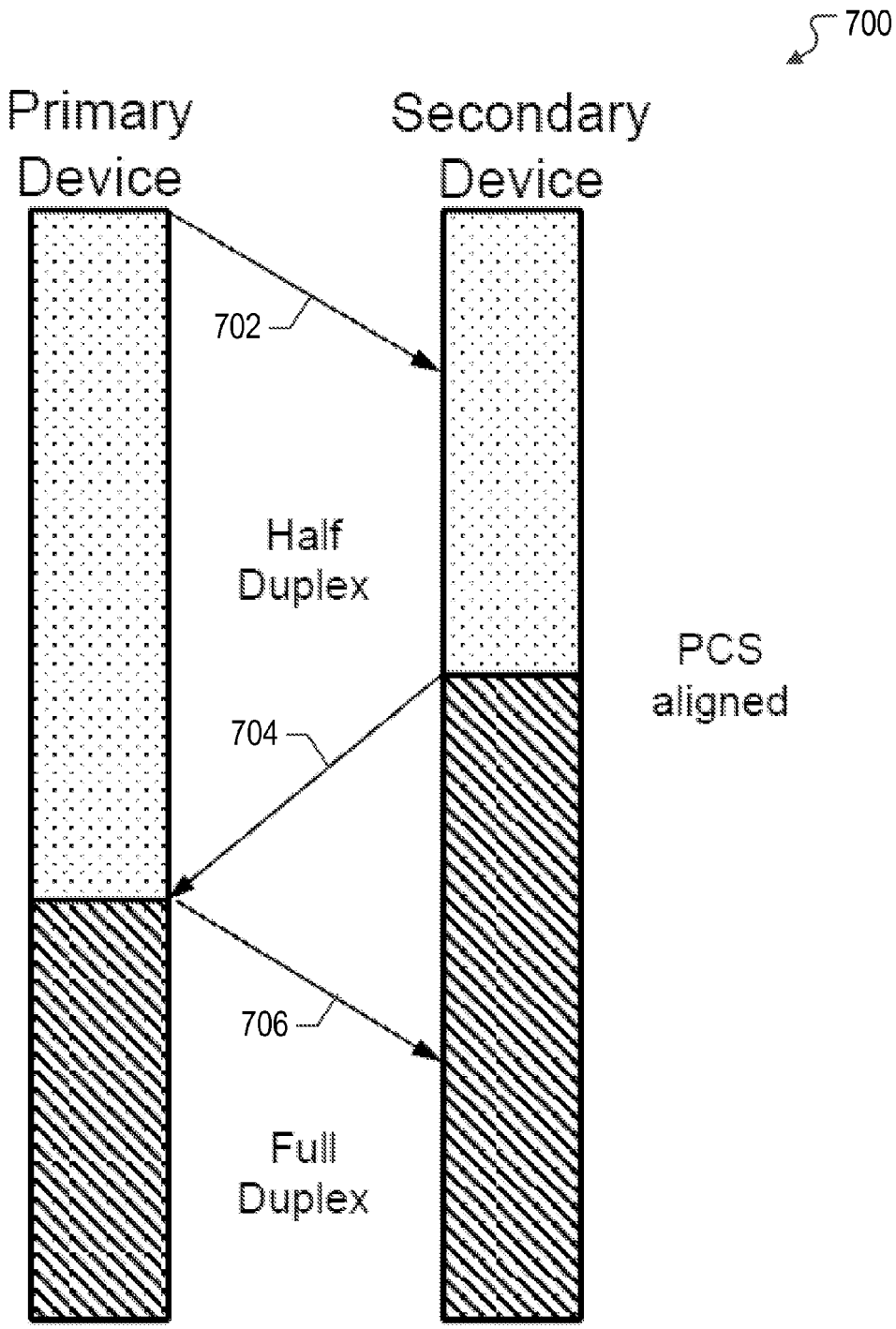
FIG. 7 illustrates a timing diagram of a polarity detection system in accordance with one or more implementations.

FIG. 7 illustrates a timing diagram 700 of a polarity detection system in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

In the timing diagram 700, the primary electronic device 102A transmits idle symbols, with any encoded handshaking signals set to, e.g., false, to the secondary electronic device 102B during the half-duplex stage of the link initialization (702). The secondary electronic device 102B performs scrambler lock and polarity correction, if necessary, during the half-duplex stage of the link initialization process. The secondary electronic device 102B initiates the full-duplex stage of the link initialization process by transmitting symbols, e.g. that include encoded handshaking signals and corrected polarity, if necessary, to the primary electronic device 102A (704), and may continue to transmit symbols to the primary electronic device 102A during the full-duplex stage of the link initialization process. The primary electronic device 102A transmits symbols, e.g. that include encoded handshaking signals, to the secondary electronic device 102B during the full-duplex stage of the link initialization process (706).

Figure 8:
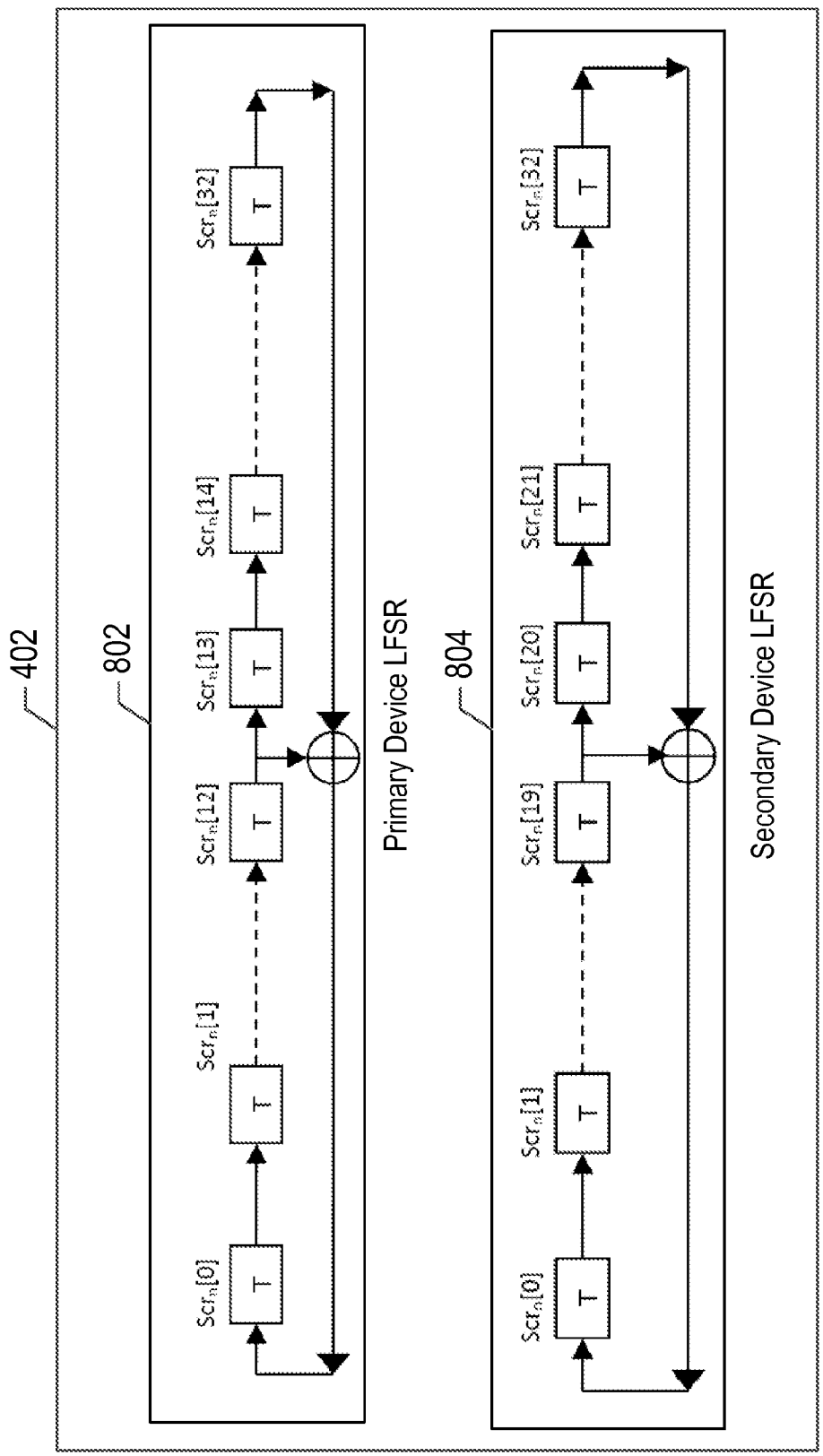
FIG. 8 illustrates an example linear feedback shift register module of an example electronic device that may implement a polarity detection system in accordance with one or more implementations.

FIG. 8 illustrates an example linear feedback shift register (LFSR) module 402 of an example physical coding sublayer (PCS) receive module 224 of an example electronic device 102B that may implement a polarity detection system in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The LFSR module 402 may operate as a primary device LFSR 802 that implements the polynomial of $g_m(x)=1+x^{13}+x^{33}$, or a secondary device LFSR 804 that implements the polynomial of $g_s(x)=1+x^{20}+x^{33}$. Thus, the primary device LFSR 802 includes a tap at the thirteenth shift register $Scr_n[12]$ and the thirty-third shift register $Scr_n[32]$, and the secondary device LFSR 804 includes a tap at the twentieth shift register $Scr_n[19]$ and the thirty-third shift register $Scr_n[32]$. In one or more implementations, the LFSR module 302 of the PCS transmit module 226 of the electronic device 102B may operate in the same, or similar, manner.

FIG. 9 illustrates an example polarity information table 900 for a polarity detection system in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

As shown in the example polarity information table 900, if the handshaking signal of loc_rcvr_status is not set to false (or not OK), or set to a value that is known in advance by a secondary electronic device 102B, the secondary electronic device 102B may be unable to distinguish between the polarities of the received signals being reversed, e.g. A (pol=1) and B (pol=1), and the loc_rcvr_status being set to true (or OK). In other words, since when the loc_rcvr_status is set to OK the bit for $Sd_n[2]$ is flipped from 1 to 0 or 0 to 1, and since the secondary electronic device 102B does not know the value of loc_rcvr_status, the secondary electronic device 102B may be unable to determine whether the polarities of the received signals are reversed or the value of loc_rcvr_status is set to true (or OK).

Figure 10:
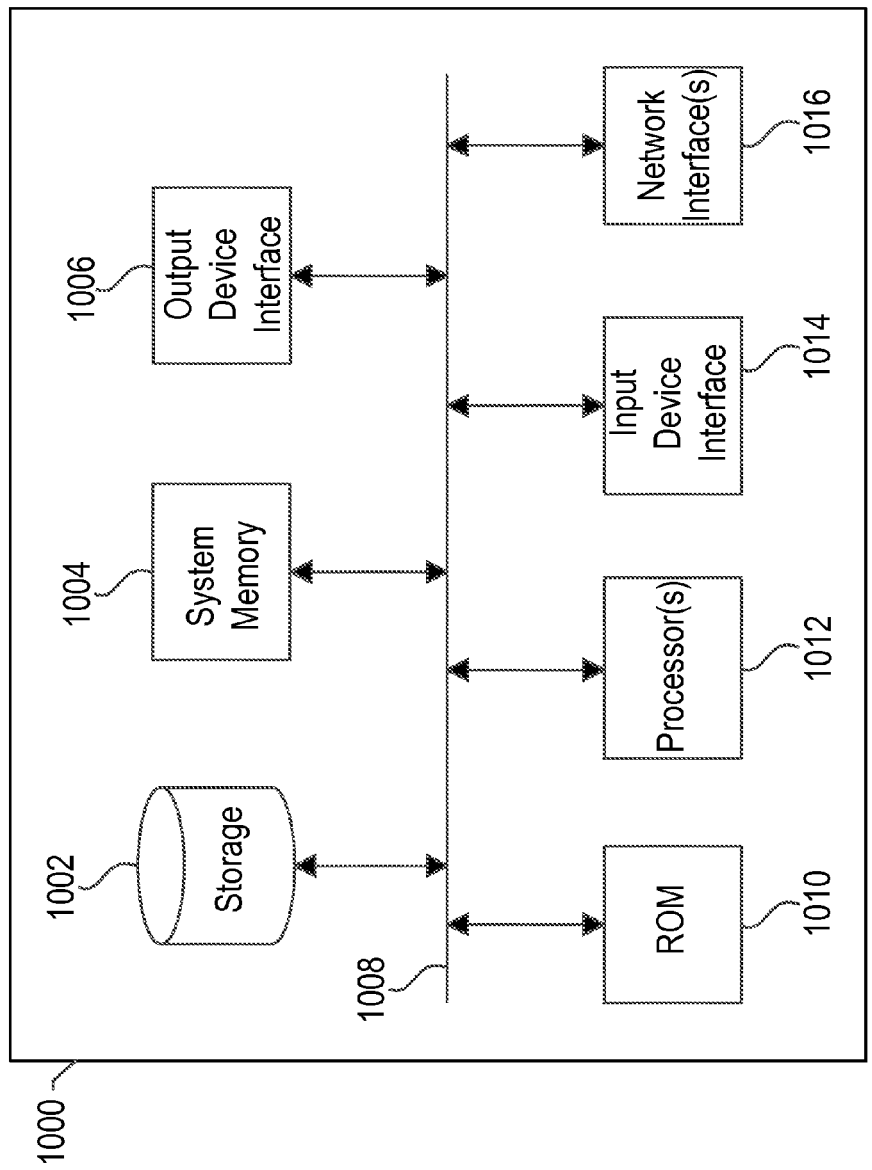
FIG. 10 conceptually illustrates an electronic system with which one or more implementations of the subject technology may be implemented.

FIG. 10 conceptually illustrates an electronic system 1000 with which one or more implementations of the subject technology may be implemented. The electronic system 1000, for example, may be, or may be coupled to, a powertrain system, a chassis system, a telematics system, an entertainment system, a camera system, a sensor system, such as a lane departure system, a diagnostics system, a gateway device, a set-top box, a desktop computer, a laptop computer, a tablet computer, a server, a switch, a router, a base station, a receiver, a phone, a personal digital assistant (PDA), or generally any electronic device that transmits signals over a network. The electronic system 1000 can be, and/or can be a part of, the network device 110, and/or one or more of the electronic devices 102A-C. Such an electronic system includes various types of computer readable media and interfaces for various other types of computer readable media. The electronic system 1000 includes a bus 1008, one or more processor(s) 1012, a system memory 1004 or buffer, a read-only memory (ROM) 1010, a permanent storage device 1002, an input device interface 1014, an output device interface 1006, and one or more network interface(s) 1016, or subsets and variations thereof.

The bus 1008 collectively represents all system, peripheral, and chipset buses that communicatively connect the numerous internal devices of the electronic system 1000. In one or more implementations, the bus 1008 communicatively connects the one or more processor(s) 1012 with the ROM 1010, the system memory 1004, and the permanent storage device 1002. From these various memory units, the one or more processor(s) 1012 retrieve instructions to execute and data to process in order to execute the processes of the subject disclosure. The one or more processor(s) 1012 can be a single processor or a multi-core processor in different implementations.

The ROM 1010 stores static data and instructions that are needed by the one or more processor(s) 1012 and other modules of the electronic system 1000. The permanent storage device 1002, on the other hand, may be a read-and-write memory device. The permanent storage device 1002 may be a non-volatile memory unit that stores instructions and data even when the electronic system 1000 is off. In one or more implementations, a mass-storage device (such as a magnetic or optical disk and its corresponding disk drive) may be used as the permanent storage device 1002.

In one or more implementations, a removable storage device (such as a floppy disk, flash drive, and its corresponding disk drive) may be used as the permanent storage device 1002. Like the permanent storage device 1002, the system memory 1004 may be a read-and-write memory device. However, unlike the permanent storage device 1002, the system memory 1004 may be a volatile read-and-write memory, such as random access memory. The system memory 1004 may store any of the instructions and data that one or more processor(s) 1012 may need at runtime. In one or more implementations, the processes of the subject disclosure are stored in the system memory 1004, the permanent storage device 1002, and/or the ROM 1010. From these various memory units, the one or more processor(s) 1012 retrieve instructions to execute and data to process in order to execute the processes of one or more implementations.

The bus 1008 also connects to the input and output device interfaces 1014 and 1006. The input device interface 1014 enables a user to communicate information and select commands to the electronic system 1000. Input devices that may be used with the input device interface 1014 may include, for example, alphanumeric keyboards and pointing devices (also called "cursor control devices"). The output device interface 1006 may enable, for example, the display of images generated by the electronic system 1000. Output devices that may be used with the output device interface 1006 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

As shown in FIG. 10, the bus 1008 also couples the electronic system 1000 to one or more networks (not shown), one or more of the electronic devices 102A-C, and/or the network device 110, through one or more network interface(s) 1016. One or more network interface(s) may include an Ethernet interface, a WiFi interface, a multimedia over coax alliance (MoCA) interface, a medium independent interface (MII), a reduced gigabit media independent interface (RGMII), or generally any interface for connecting to a network. The one or more network interfaces 1016 may include, or may be coupled to, a physical layer module, such as the PHY module 220. In this manner, the electronic system 1000 can be a part of one or more networks of computers (such as a local area network ("LAN"), a wide area network ("WAN"), or an Intranet, or a network of networks, such as the Internet. Any or all components of the electronic system 1000 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In some implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as application specific integrated circuits (ASICs) or field programmable gate arrays (FPGAs). In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed;

rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method for polarity detection, the method comprising:
    receiving, by a secondary device, a first signal and a second signal from a primary device during a half-duplex stage of a link initialization;
    determining, during the half-duplex stage, whether a descrambler of the secondary device can be locked to a scrambler of the primary device using at least the first signal or the first signal with a first polarity reversed;
    changing, during the half-duplex stage, a symbol boundary associated with the first signal when the descrambler cannot be locked using at least the first signal or the first signal with the first polarity reversed;
    determining, during the half-duplex stage of the link initialization, whether the first polarity of the first signal and a second polarity of the second signal are reversed based at least on whether the descrambler can be locked using at least the first signal or the first signal with the changed symbol boundary; and
    reversing, by the secondary device, polarities of signals subsequently received from, and transmitted to, the primary device when the first polarity of the first signal and the second polarity of the second signal are reversed.

2. The method of claim 1, wherein a handshaking signal that is encoded by the first signal and the second signal is set to false.

3. The method of claim 2, wherein determining, during the half-duplex stage of the link initialization, whether the first polarity of the first signal and the second polarity of the second signal are reversed further comprises determining, during the half-duplex stage of the link initialization and based at least on the handshaking signal and whether the descrambler can be locked using at least the first signal or the first signal with the first polarity reversed, whether the first polarity of the first signal and the second polarity of the second signal are reversed.

4. The method of claim 1, further comprising:
    determining a third polarity of a third signal and a fourth polarity of a fourth signal based at least on whether the first polarity of the first signal and the second polarity of the second signal are reversed; and
    initiating a full-duplex stage of the link initialization by transmitting the third signal and the fourth signal to the primary device.

5. The method of claim 4, further comprising:
    receiving a fifth signal and sixth signal from the primary device; and
    determining a fifth polarity of the fifth signal and a sixth polarity of the sixth signal based at least on whether the first polarity of the first signal and the second polarity of the second signal are reversed.

6. The method of claim 1, wherein the secondary device is communicably coupled to the primary device via a single twisted pair of wires, the first signal is received over a first wire of the single twisted pair of wires and the second signal is received over a second wire of the single twisted pair of wires.

7. The method of claim 1, wherein the symbol boundary delineates individual symbols.

8. The method of claim 7, further comprising:
    changing the symbol boundary associated with the first signal and the second signal; and determining whether the descrambler of the secondary device can be locked to the scrambler of the primary device based at least on the reversed first polarity of the first signal and the changed symbol boundary.

9. The method of claim 1, further comprising:
receiving a clock source from the primary device for the link initialization.

10. A communication device comprising: a physical coding sublayer module comprising:
a descrambler that is configurable to synchronize with a scrambler of another communication device; and
a polarity corrector that is configurable to reverse polarities of symbols transmitted to and received from the another communication device; and wherein the physical coding sublayer module is configured to:
receive a clock source from the another communication device for link initialization, receive, during a half-duplex link initialization stage, first training symbols having a first polarity and second training symbols having a second polarity, determine, during the half-duplex stage, whether the descrambler can be locked to the scrambler of the another device based at least on the first training symbols, reverse the first polarity of the first training symbols or change a symbol boundary associated with the first training symbols and the second training symbols during the half-duplex link initialization stage when the descrambler is unable to be locked using at least the first training symbols,
synchronize, during the half-duplex link initialization stage, the descrambler to the scrambler of the another communication device based on at least one of the reversed first polarity associated with the first training symbols or the changed symbol boundary of the first training symbols when the descrambler is unable to be locked using at least the first training symbols, and
configure the polarity corrector to reverse the symbols subsequently transmitted to, and received from the another communication device when the descrambler is synchronized based at least on the reversed first polarity associated with the first training symbols.

11. The communication device of claim 10, wherein the physical coding sublayer module further comprises a memory that stores a value of a handshaking signal encoded by the first and second symbols during the half-duplex link initialization stage.

12. The communication device of claim 11, wherein the physical coding sublayer module is further configured to:
synchronize, during the half-duplex link initialization stage, the descrambler to the scrambler of the another communication device based at least on the stored value of the handshaking signal and the reversed first polarity associated with the first symbols.

13. The communication device of claim 10, wherein the polarity corrector is configured to reverse a third polarity of a third symbol and a fourth polarity of a fourth symbol and the physical coding sublayer module is configured to initiate transmission of the third symbol and the fourth symbol to the another communication device.

14. The communication device of claim 10, wherein the physical coding sublayer module receives, during a full-duplex link initialization stage, a third symbol and a fourth symbol from the another communication device and the polarity corrector is configured to reverse a third polarity of the third symbol and a fourth polarity of the fourth symbol.

15. The communication device of claim 10, wherein the communication device further comprises a medium independent interface that is coupled to a single twisted pair of wires, the first training symbols are received over a first wire of the single twisted pair of wires, and the second training symbols are received over a second wire of the single twisted pair of wires.

16. The communication device of claim 10, wherein the symbol boundary delineates individual symbols of the first and second training symbols.

17. A computer program product comprising instructions stored in a non-transitory computer-readable storage medium, the instructions comprising:
instructions to receive first training symbols via a first channel and second training symbols via a second channel during a half-duplex link initialization stage;
instructions to determine, during the half-duplex link initialization stage, whether a first polarity associated with the first channel is reversed based at least on whether a descrambler can be locked using at least the first symbols or using the first symbols with the first polarity reversed;
instructions to change, during the half-duplex link initialization stage, a symbol boundary associated with the first training symbols and the second training symbols when the descrambler cannot be locked using at least the first symbols or using the first symbols with the first polarity reversed;
instructions to determine, during the half-duplex link initialization stage, whether the first polarity associated with the first channel is reversed based at least on whether the descrambler can be locked using at least the first symbols with the changed symbol boundary or using the first symbols with the changed symbol boundary and the first polarity reversed; and
instructions to reverse the first polarity of the first symbols subsequently received, and transmitted, over the first channel and a second polarity of second symbols subsequently received, and transmitted, over the second channel when the first polarity associated with the first channel is reversed.

18. The computer program product of claim 17, wherein the first channel comprises a first wire of a twisted pair of wires and the second channel comprises a second wire of the twisted pair of wires.

19. The computer program product of claim 17, wherein the symbol boundary delineates individual symbols.

20. The computer program product of claim 17, wherein a handshaking signal encoded by the first and second symbols is set to false, and the instructions further comprise:
instructions to determine, during the half-duplex link initialization stage, whether the first polarity associated with the first channel is reversed based at least on the handshaking signal being set to false and whether the descrambler can be locked using at least the first symbols.

* * * * *